March 8, 1932. I. SIKORSKY 1,848,389
AIRCRAFT, ESPECIALLY AIRCRAFT OF THE DIRECT LIFT AMPHIBIAN
TYPE AND MEANS OF CONSTRUCTING AND OPERATING THE SAME
Original Filed Feb. 14, 1929 8 Sheets-Sheet 6

March 8, 1932.                I. SIKORSKY                    1,848,389
      AIRCRAFT, ESPECIALLY AIRCRAFT OF THE DIRECT LIFT AMPHIBIAN
        TYPE AND MEANS OF CONSTRUCTING AND OPERATING THE SAME
                    Original Filed Feb. 14, 1929    8 Sheets-Sheet 8

Fig. 20.

Inventor
Igor Sikorsky
By
Attorney

Patented Mar. 8, 1932

1,848,389

UNITED STATES PATENT OFFICE

IGOR SIKORSKY, OF NICHOLS, CONNECTICUT, ASSIGNOR TO SIKORSKY AVIATION CORPORATION, OF WILMINGTON, DELAWARE, A CORPORATION OF DELAWARE

AIRCRAFT, ESPECIALLY AIRCRAFT OF THE DIRECT LIFT AMPHIBIAN TYPE AND MEANS OF CONSTRUCTING AND OPERATING THE SAME

Application filed February 14, 1929, Serial No. 339,784. Renewed May 26, 1931.

The present invention relates broadly to aircraft and more particularly to aircraft of the direct lift type.

It concerns a new method of constructing and operating direct lift aircraft in a manner to insure increased safety, maneuverability, comfort and reliability during taking off, flying and alighting operations.

It further contemplates aircraft provided with direct lift driving means which are driven by air or other gases issuing from reaction jets in said driving means.

It also has to do with the position, form and arrangement of the various parts of direct lift aircraft structures, as well as the form, arrangement, relative position, interrelation and details of fixed, movable and adjustable fixtures contained in or forming a part of direct lift aerial vehicles, the relation of said fixtures to each other as well as their relation to other structural elements in said aerial vehicles.

The invention further pertains especially to various combinations of any or all of said above improvements, their application to, or their use on, in, or in connection with individual heavier-than-air aircraft units of the multimotor, land-water-air type, capable of navigating with equal facility on land, water or in the air.

Where the term "aircraft" is used in the present application it includes any form of aerial vehicle capable of navigating through the air. The invention has application to aircraft of the heavier-than-air, lighter-than-air or combination type.

The term, "heavier-than-air aircraft unit of the multimotor, land-water-air type" designates a form of aircraft sometimes known as a "multimotor amphibian."

In one of its aspects the invention has to do specifically with an amplibian provided with a direct lift propeller and a plurality of horizontally acting propellers, all of the propellers being reaction-driven, that is, being rotatable under the reactive force of a fluid medium under pressure discharged through orifices in their blades toward the following edges.

As another feature of the invention an aerofoil of relatively short span is interposed between the direct lift propeller and the horizontally acting propellers. Further, the body of the amphibian supports laterally extending outriggers to which are hinged ailerons and at whose lower sides floats are secured.

The inherent structural characteristics of multimotor amphibians are such as to give rise to large parasitic drag. Consequently, the present invention has particular reference to this type of machine, since by the substitution of small transfer boxes for fluid under pressure in place of the usual engine nacelles, the resistance is greatly reduced with proportionate benefit to the flying characteristics of the machine.

As has been indicated above, in the preferred embodiment of my invention, a single direct lift propeller of large blade area is employed and a plurality of horizontally acting propellers are arranged in symmetrically horizontally spaced relation to the direct lift propeller. Thus by appropriate throttling of the horizontally acting propellers, the torque of the direct lift propeller may be effectively compensated.

The blades of the propellers are provided with orifices adjacent their trailing edges and with orifices adjacent their leading edges discharging toward the trailing edges across their negative or depression sides. The fluid under pressure discharged through the first mentioned orifices imparts rotation to the propellers in which effect the pressure medium discharged through the other set of orifices participates, although this latter is of greater importance as performing a lifting function.

The medium used may be air or air mixed with other gases such as the exhaust gases of internal combustion engines used to drive the air pump. However, I do not limit myself with respect to the nature of the fluid medium which may be any such as may be convenient and practicable.

According to one phase of the invention, the air which is to be supplied to the reaction propellers is first of all mechanically placed under pressure by means of a positive action air pump or blower, and during its subsequent passage to the propellers, is expanded by application of heat thereto with consequent increase in work capacity. The heating of the air may be accomplished in a number of different ways which will be hereinafter described.

In addition to the mechanical advantages obtained by thus expanding the air, the discharged air serves the purpose of preventing, to a large extent, the formation of ice on the aircraft members.

An embodiment of the invention will be described in detail with reference to the accompanying drawings in which.

Referring first to Figs. 1 to 4, 10 designates the body-boat of an amphibian, while 12 designates streamline outriggers, springing laterally from the body-boat and joined together at their outer ends by means of members 10c and 10d. The rear outriggers have hinged thereto ailerons 10e and 10f, while floats 10g and 10h are secured beneath the outer ends of the outriggers. An aerofoil 11 of relatively short span is disposed above the body-boat and interconnected therewith as by struts 10i, 10k etc.

A shaft 12s, normally lying in a vertical line passing through the center of gravity of the machine, supports a direct lift propeller 10m here shown as comprising an open framework boss 10n and blades 10p. Streamline housings 10q supported from suspension members 10r secured to the lower surface of plane 11 adjacent its ends, encase transfer boxes for the fluid pressure medium, which boxes in turn support shafts on which propellers 10s are mounted. Outriggers 10t spring rearwardly from plane 11 and support empennage assembly 10v at their outer ends. The outriggers 10t have a direct connection with the rear end of body-boat 10 through struts 10w.

Landing wheels 15, Figs. 2 to 6, may be moved from the operative position shown to an inoperative position in which they lie in horizontal planes immediately below outriggers 12.

Figure 1:
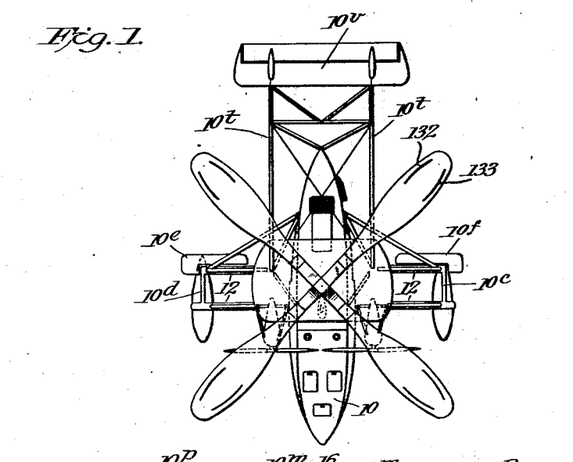
Fig. 1 is a plan view of an amphibian constructed in accordance with the present invention.
Figure 2:
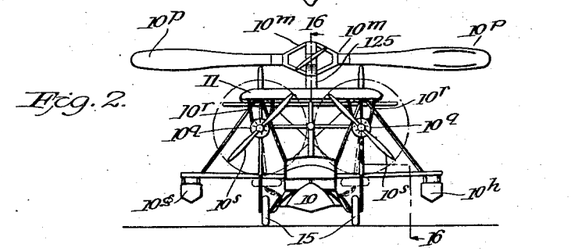
Fig. 2 is a front elevation of the amphibian.
Figure 3:
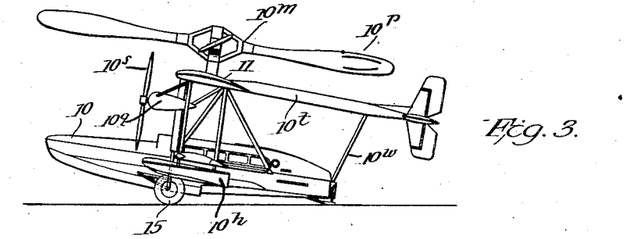
Fig. 3 is a side elevation of the amphibian.
Figure 4:
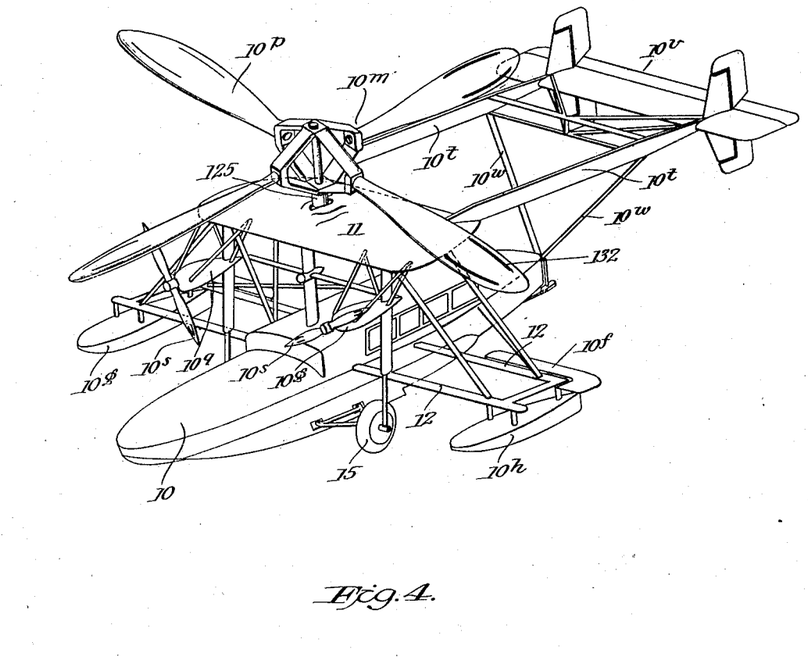
Fig. 4 is an isometric perspective of the amphibian.
Figure 5:
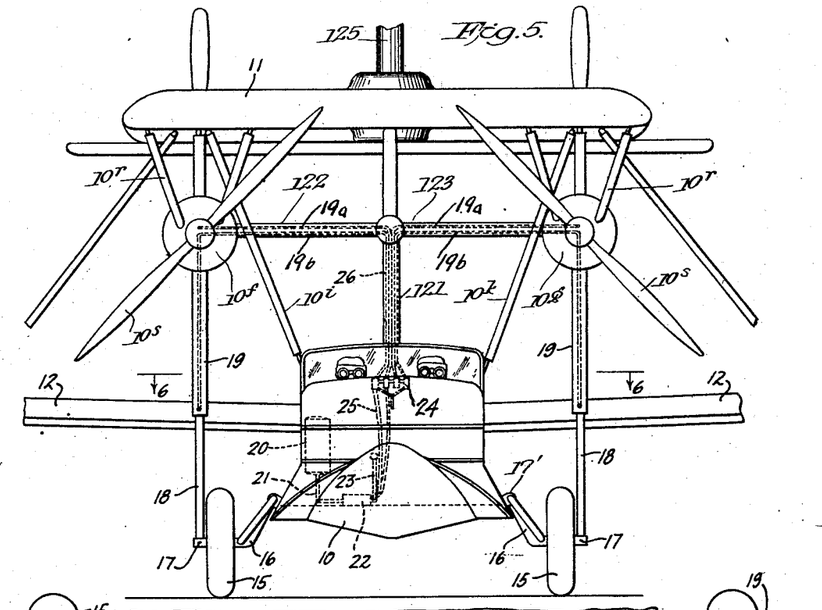
Fig. 5 is an enlarged view in front elevation of the central portion of the amphibian.
Figure 6:
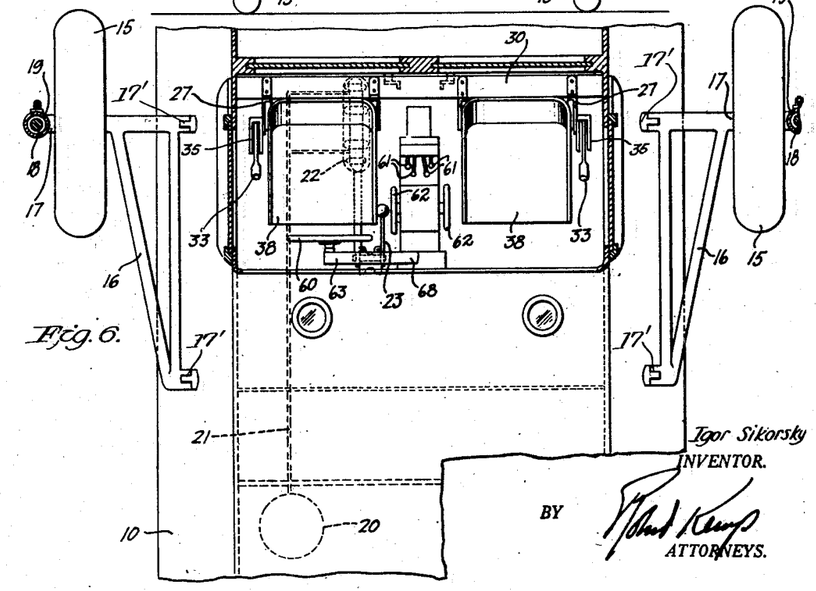
Fig. 6 is a section on the line 6—6 of Fig. 3.

Referring particularly to Figs. 5 and 6, it will be seen that the wheel axles 17 are supported on brackets 16 pivotally connected to the body 10 at points 17' for movement about normally substantially horizontal axes. The outer ends of wheels 17 are pivotally connected to rods 18 guided in tubular members 19 which are in turn pivoted at their upper ends to the frame structure. Rods 18 are provided interiorly of tubular members 19 with piston heads which are adapted to be suitably influenced to move the wheels from operative to inoperative position.

According to the illustrated arrangement, hydraulic pressure is employed for this motive function, the particular fluid medium preferably being oil, glycerine or the like. A supply of the pressure medium is contained in a tank 20 and a conduit 21 leads from the tank to a pressure generating device 22 which is controlled by means of a lever 23. The lines to and from pressure generator 22 are indicated at 25 and lead to a distributor 24 disposed within convenient reach of the pilot in the pilots' compartment 30. Distributor 24 is connected to tubular members 19 by means of pipes 19a and 19b, the former debouching into the tubular members above the upper limit of travel of the piston heads associated with rods 18, and the latter debouching into said members below the lower limit of travel of the piston heads. Distributor 24 is suitably provided with valves so that fluid may be supplied at will to one or both of conduits 19a or to one or both of conduits 19b so that the wheels 15 may be correspondingly raised or lowered.

The fluid medium, in addition to acting as an operating agent, has the function of serving as cushioning means when the machine is landed on its wheels.

It will be noted that the pilots' compartment 30 is provided with two chairs 38 placed side by side. Since the arrangement of this compartment and the control devices therein have been particularly described and claimed in my above named applications, it will suffice here to state that the reference numerals 61 indicate the engine control levers, 33 indicates levers cooperating with segments 35 to adjust the seats to various heights and retain them in adjusted position, 62 indicates the stabilizer controls and 60 indicates the aileron control member which has a pivoted extension 63 so supported that it may be swung to bring wheel 60 in front of either chair 38.

Figure 7:
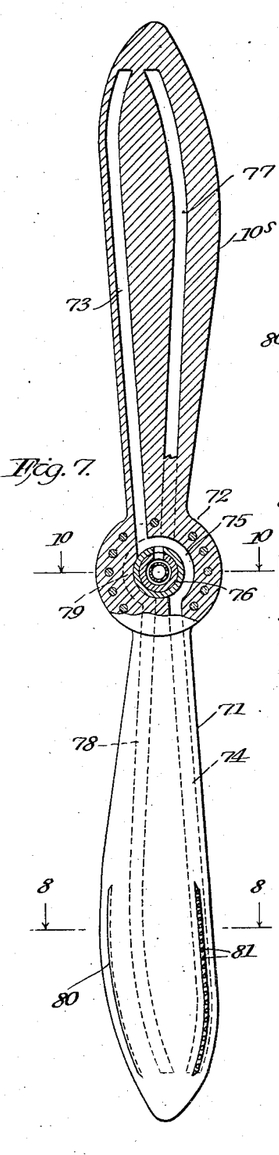
Fig. 7 is an elevation of a propeller back, partly in section.
Figure 8:
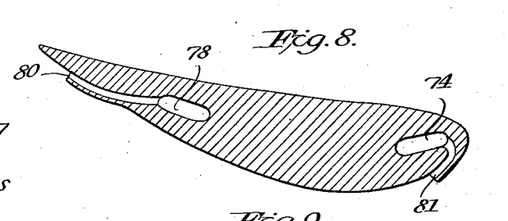
Fig. 8 is a section on line 8—8 of Fig. 7.
Figure 9:
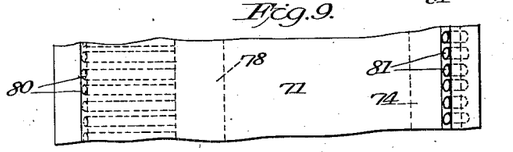
Fig. 9 is an enlarged elevation of a portion of the propeller shown in Fig. 7.
Figure 10:
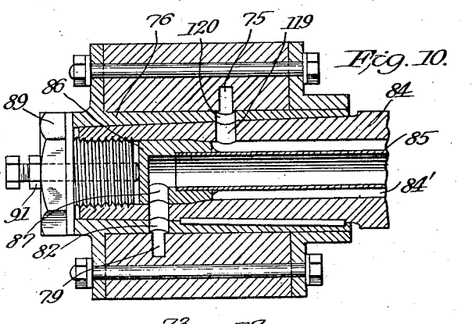
Fig. 10 is a section on line 10—10 of Fig. 7.
Figure 11:
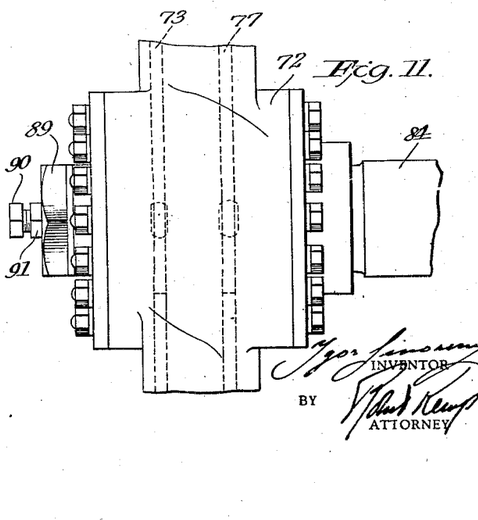
Fig. 11 is a side elevation of the propeller boss.
Figure 12:
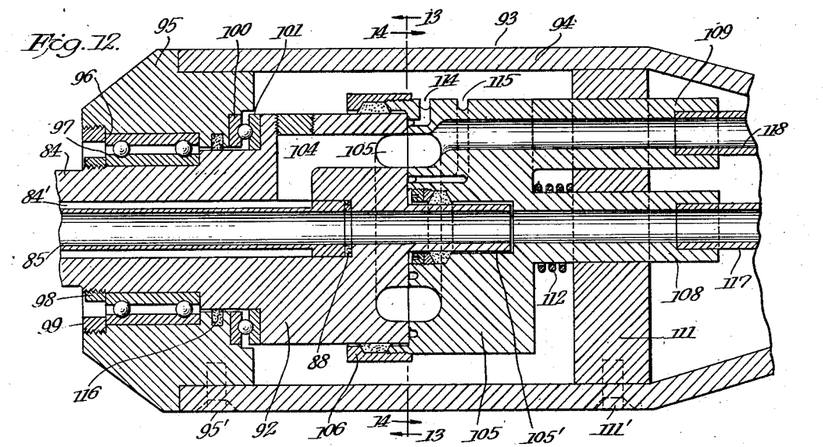
Fig. 12 is a longitudinal section through a transfer box for the fluid pressure medium.

In Fig. 7 a propeller 10s is shown comprising blades 70 and 71 and boss 72. The leading edge of each blade is provided with a longitudinal passage 73 and 74 respectively, these being joined by an arcuate recess 75 surrounding the propeller hub 76. Each blade has also a longitudinally extending passage 77 and 78 respectively adjacent the following edge, these passages being connected by an arcuate recess 79 similar to 75. For a distance adjacent the blade tips, discharge orifices 80 and 81 are formed, which communicate with passages 78 and 74 respectively. As particularly shown in Fig. 8, the propeller back is stepped downwardly toward its following edge, there being two steps determining respectively the position of orifices 81 and 80. Referring to Fig. 10, hub 76 is provided with an aperture 82 communicating with recess 79. Aperture 82 likewise registers with an aperture 83 formed in the wall of a hollow shaft 84 (see also Fig. 12) to the end of which the propeller hub is keyed. A tube 85, Figs. 10 and 12, is supported concentrically of the bore 84' of shaft 84 and is closed at its front end, Fig. 10, by means of a cap 86 having an aperture 87 in register with aperture 83. The rear end of tube 85, Fig. 12 is provided with a circumferential flange for the purpose of maintaining the tube in concentric relation to bore 84', the rear end of tube 85 seating against washer 88. The propeller hub is secured to the end of shaft 84 by means of a cap screw 89 cooperating with threads formed in the end of bore 84'. Cap screw 89 is provided with a threaded axial bore in which engages cap screw 90 which abuts with its inner end cap 86 to hold the latter and tube 85 in proper position. A nut 91 serves to lock cap screw 90 in adjusted position.

The end of shaft 84, remote from the propeller, is provided with an expanded head 92 extending within transfer box 93, Fig. 12. Transfer box 93 comprises a hollow cylindrical member 94 supporting at its end adjacent the propeller a ring 95 which latter and shaft 84 are appropriately shouldered to receive the members 96 and 97 of a ball bearing assembly constituting a journal bearing for the propeller shaft, members 96 and 97 being respectively held in position by means of rings 98 and 99.

The adjacent vertical faces of ring 95 and head 92 support members 100 and 101 of a ball bearing assembly which constitutes the thrust bearing. Ring 95 is rigidly secured to casing 94 by means of screws such as shown at 95'.

The rear face of head 92 is provided with an annular recess 105 concentric with bore 84'. This recess communicates by means of an angular passage 104 with bore 84' forward of the flanged head of tube 85. A fitting 105 has a face adapted to contact with the rear face of head 92, this member being provided with a circumferential flange circumscribing the rear margin of head 92 and cooperating with ring 106 to form a packing gland. Member 105 is provided with a bore 105' into which a central tubular extension 102 of head 92 projects and a packing gland 106 is provided to effect a tight fit between the extension and bore 105'. Member 105 is provided with a rearward tubular extension 108 concentric with bore 105' and also with an eccentric rearward extension 109 provided with a bore which communicates with an annular recess 110 registering with recess 103. Extensions 108 and 109 pass through closely fitting apertures in a wall 111 secured within casing 94 by means of screws such as shown at 111', the casing tapering off rearward of wall 111. Rotation of fitting 105 about extension 108 is prevented by the eccentric extension 109, although axial movement of the fitting relative to wall 111 is permitted. A spring 112 yieldingly urges fitting 105 against head 92.

In practice, the interior of the casing will be filled with oil, the contacting faces of members 92 and 105 receiving lubricants through ducts 114 and 115. The escape of the oil from the forward end of the casing is prevented by a gasket 116. The fluid medium under pressure is supplied to the hollow stem 108 through a preferably flexible tube 117 which leads from air air pump preferably disposed in the body-boat. The air thus supplied passes through head 92, tube 85, apertures 87, 83, 82, recess 79 and passages 77 and 78 to discharge orifices 80. Air conducted to tubular extension 109 through pipe 118 flows into the registering annular recesses 110 and 103, passage 104, bore 84', an aperture 119 in shaft 84, an aperture 120 in hub 76, recess 75 and passages 73 and 74 to discharge orifices 80.

The transfer boxes 93, as has been mentioned above, are disposed in streamline housings 10q and rigidly secured in position through struts 10r. Pipes 117 and 118 (see also Figs. 16 and 18) are preferably led to the transfer boxes through the streamline conduits 121, 122 and 123, Fig. 5, which likewise house tubes 19a and 19b. All conduits, connections and other passages arranged to lead air to horizontal left side propeller 10s are also duplicated preferably in a symmetrical fashion for the same purpose of supplying air to right side propeller 10s.

The direct lift propeller 10m will now be described with particular reference to Figs. 1 to 4, 16, 18 and 19.

Figures 16, 17:
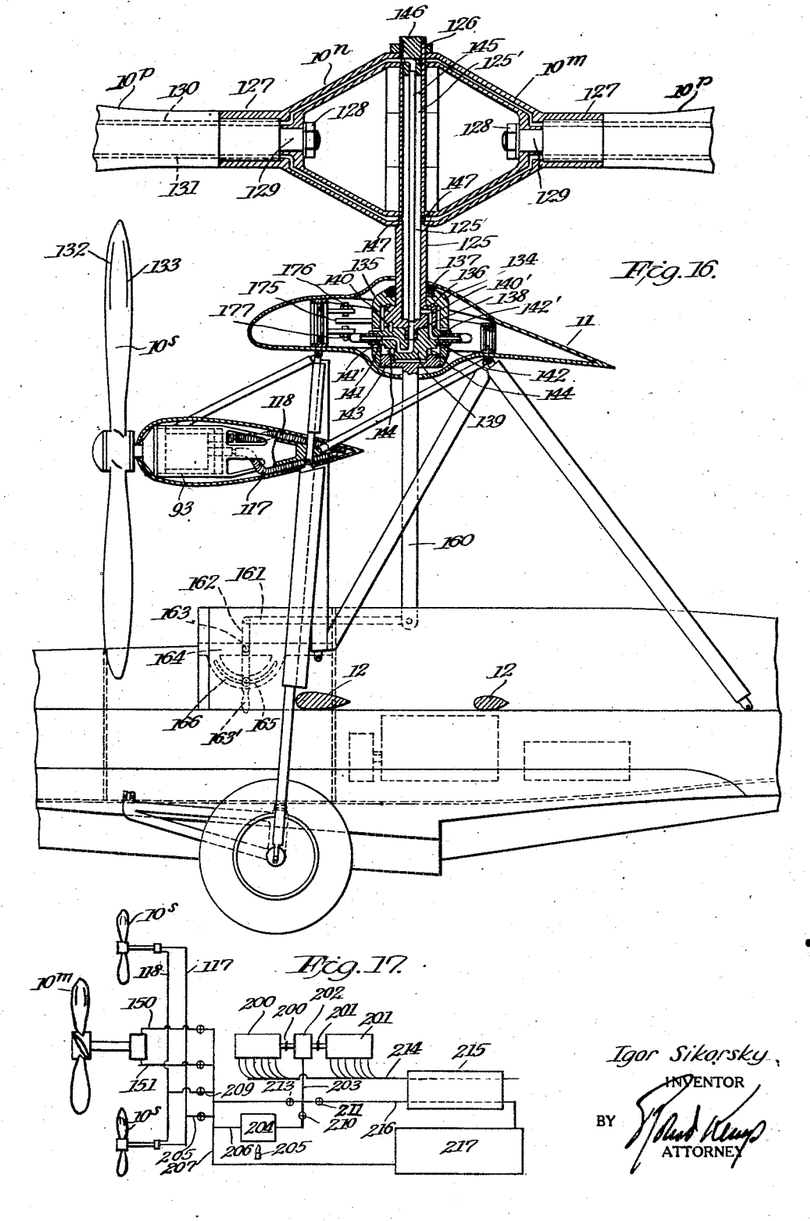
Fig. 16 is a section on line 16—16 of Fig. 2.
Fig. 17 is a diagram showing another arrangement of the units comprising the propulsion system.

Referring particularly to Fig. 16, it will be seen that the propeller boss 10n consists of crossed loop-shaped members mounted at their crossed portions on a hollow vertical shaft 125. The lower members of the loops bear against a shoulder 125', while a nut 126 secures them in position on the shaft. Blades 10p are secured in ferrules 127 integral with the loops and extending radially relatively to shaft 125. The propeller blades are secured in position by means of nuts 128 screwed to their stems 129. It will be seen that each blade is supported at an apex of a substantially triangular frame, the opposite triangular frames forming an integral frame of symmetrical substantially rhomboidal shape, these closed frames having major and minor axes, the propeller blades being in alignment with the major axis, while the frame is supported for rotation about its minor axis. The described arrangement gives a particularly rigid construction in that the boss has a large axial extent and supports the blades at a considerable distance from its rotational axis.

As shown in Fig. 16, the frame members of the boss are hollow and communicate with longitudinally extending passages 130 and 131 formed in the blades. Passage 130 communicates with orifices 132 in the leading edge of the blades, while passages 131 communicate with orifices 133 in the trailing edges in the same manner as has been described in connection with propeller 10s.

The lower end of shaft 125 is disposed in a transfer box 134 which is supported in aerofoil 11, the latter having a central vertically expanded portion for the accommodation of the box. Shaft 125 has an expanded head 135 interiorly of the transfer box and forms a thrust member cooperating with the latter through balls 136. A ball bearing journal support is indicated at 137. The lower face of head 135 is provided with an extension 138 which mates with a recess formed in the face of a fitting 139, the extension and recess being concentric with bore 125' of shaft 125. The contacting faces of head 135 and member 139 are provided with registering annular recesses concentric with extension 138 and forming together a tubular duct 140. At diametrically opposite points member 139 is provided with arms 141 and 142 which extend through slots formed in the side walls of box 134, these slots extending in the axial direction of shaft 125. The engagement of extensions 141 and 142 with the walls of the slots prevents rotation of member 139 relative to box 134, although axial movement is permitted. The lower end of the box is closed by means of a cap 143 and between the latter and member 35 are interposed compression springs 144 which yieldingly urge member 139 against head 135.

Extension 141 has formed therein a passage 141' which through extension 138, a tube 145 and passages in a block 146 in register with the passages formed in the upper frame members, communicates with blade passages 130. Extension 142 has a passage 142' communicating with chamber 140 and thence through a passage 140' with bore 125'. Bore 125' communicates by means of apertures 147 with the passages of the lower frame members of boss 10n and thence with the blade passages 131. Extensions 141 and 142 are connected by means of flexible tubing 150 and 151 with the blower, tubes 150 and 151 being passed downwardly to the blower through the streamline conduit 121.

Figures 18, 19:
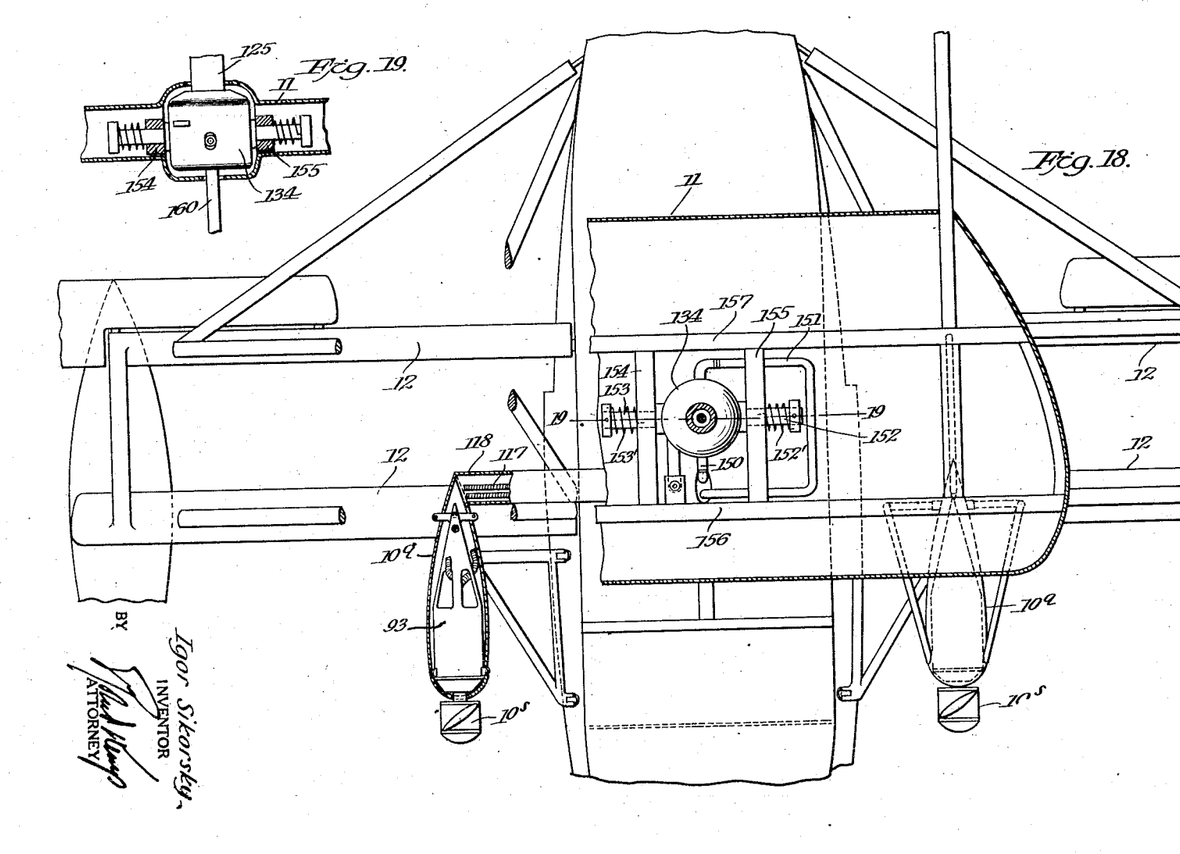
Fig. 18 is a plan view of a portion of the amphibian with parts in section.
Fig. 19 is a section on line 19—19 of Fig. 18.

Box 134, Fig. 18, is provided on diametrically opposite sides with trunnions 152 and 153 supported in members 154 and 155 which are mounted between the front and rear spars 156 and 157 of aerofoil 11. Oppositely acting torsion springs 152' and 153' tend to maintain shaft 125 in a constant position relative to members 154 and 155, this position being vertical when the machine is in operation.

Extending downwardly from cap 143, Fig. 16, is a rod 160 which at its lower end is connected by means of a link 161 to a lever 162 pivotally mounted at 163 to a frame 164 disposed in the pilots' compartment. Lever 162 is provided with a handle 163 within easy reach of the pilot and may be locked in adjusted position by means of a threaded stud and nut 165 which cooperate with a slotted segment 166. Movement of handle 163 causes a corresponding movement of box 134 about its trunnions and consequently a tilting movement of shaft 125 in a fore and aft direction. It will be noted that the covering of aerofoil 11 is provided with top and bottom slots to permit free movement of shaft 125 and rod 160.

According to the described arrangement, shaft 125 may be adjusted from a vertical position in which propeller 10m exerts a purely vertical force, to a forwardly tilted position in which a forwardly acting resultant is obtained. The tilting movement of box 134 is limited by means of an arm 175 fixed thereto and cooperating with adjustable abutments 176 and 177.

In Fig. 17, I have shown a layout of one form of an entire propulsion system. In this figure numerals 200 and 201 denote internal combustion engines operating a positive action pump or blower 202 through the intermediary of clutches 200' and 201'. A line 203 connects the outlet of the blower with a chamber 204 adapted to be heated by means of a burner 205. Chamber 204 communicates by means of a line 206 with a line 207 from which branches 208 and 209 lead respectively to lines 117 and 118, which feed the horizontally acting propellers 10s. Branches 150 and 151 feed the direct lift propeller 10m.

By closing valves 210 and 211, the air may be passed directly through line 212, valve 213 being open, to line 207. The exhaust of both engines is led into a line 214 which passes through a heat exchanger 215 through which likewise passes a line 216, which through an air expansion chamber or reservoir 217 is in communication with line 207. By opening valve 211 and closing valves 210 and 213, air from the blower may be passed through the heat exchanger, the reservoir and line 207 to the propellers.

Thus, it will be seen that blower 202 may be operated by one or the other of motors 200 or 201 or by both of them and that the air therefrom may be led directly to line 207 and thence to the propellers, or may be warmed by passage through chamber 204, or may be warmed by passage through chamber 215 and then led to the propellers.

Figure 20:
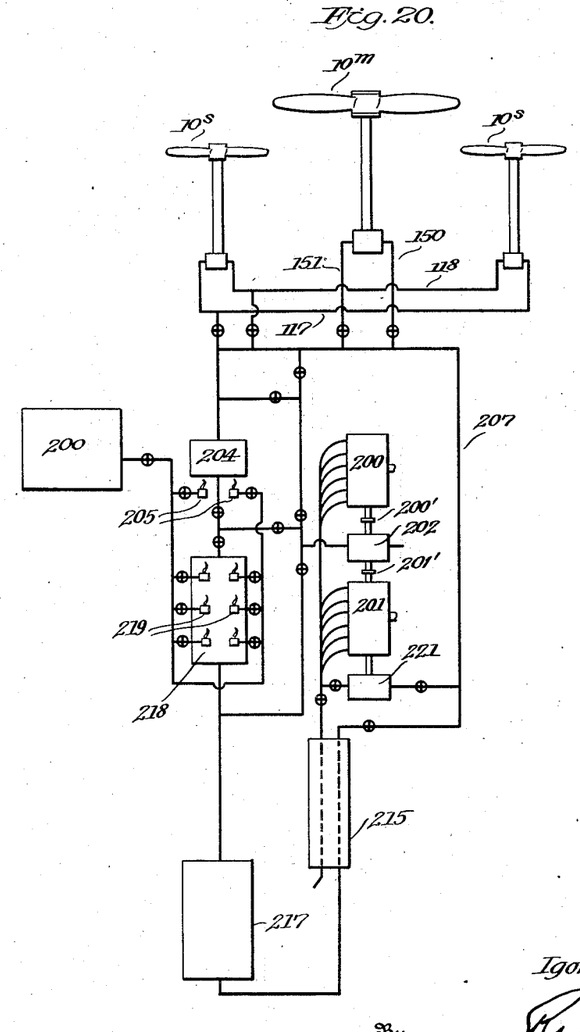
Fig. 20 is a diagram showing a modified arrangement of units comprising the propulsion system.

The layout according to Fig. 20 is generally similar to that of Fig. 17, although according to this figure, the air may be passed additionally through a chamber 218 in direct contact with burners 219, both the latter and burners 205 being supplied with fuel from a tank 220. Further, according to this showing, the exhaust may be by-passed through a blower 221 into line 207. It is obvious that various combinations are possible through the proper manipulation of the illustrated valves and it is not believed that further description is necessary.

Figures 13, 14, 15:
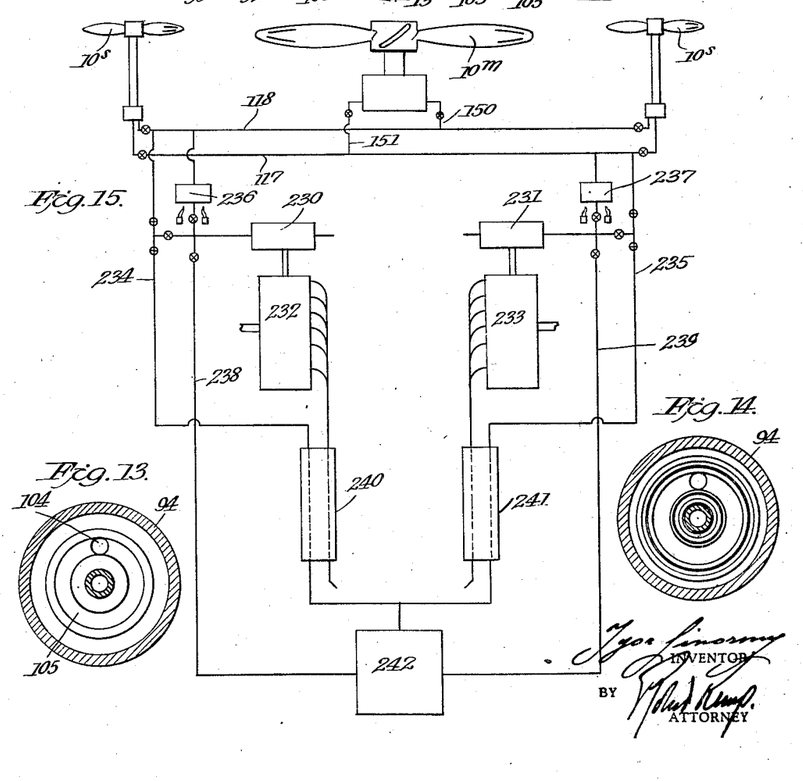
Fig 13 is a partial section along line 13—13 of Fig. 12.
Fig. 14 is a partial section along line 14—14 of Fig. 12.
Fig. 15 is a diagram showing one form of arrangement of the units comprising the propulsion system.

According to Fig. 15, two blowers 230 and 231 are provided, each being driven by an independent internal combustion engine 232 and 233. Blowers 230 and 231 may discharge directly into lines 234 and 235 and thence to lines 117, 118, 150 and 151 to supply the propellers. By suitable manipulation of the valves, however, the blowers may be connected directly through heated chambers 236 and 237, to lines 117 and 118. By a further manipulation of the valves, the air from the blowers may be diverted into lines 238 and 239 to reservoir 242 and thence through heat exchangers 240 and 241 to lines 234 and 235. According to this arrangement, one blower alone may supply line 117 and the other line 118, or one blower alone may supply both lines.

While I have described my invention with some particularity, it is to be understood that I do not intend to restrict myself except as determined in the following claims.

I claim:

1. In an aircraft, a direct lift reaction driven propeller, a rotatable vertical shaft on which the propeller is mounted, an aerofoil beneath said propeller and a transfer box for a fluid medium under pressure and including bearing means for said shaft disposed in said aerofoil.

2. In an aircraft, a direct lift reaction driven propeller, a rotatable vertical shaft on which the propeller is mounted, an aerofoil beneath said propeller, a transfer box for fluid medium under pressure and including bearing means for said shaft disposed in said aerofoil, and mounting means for said box to enable it to tilt to move the shaft relative to said aerofoil out of its normal vertical position.

3. In an aircraft, a direct lift reaction driven propeller, a rotatable vertical shaft on which the propeller is mounted, an aerofoil beneath said propeller, a transfer box for fluid medium under pressure and including bearing means for said shaft disposed in said aerofoil, and mounting means for said box to enable it to tilt to move the shaft relative to said aerofoil out of its normal vertical position in a fore and aft direction.

4. In an aircraft, a direct lift reaction driven propeller, a rotatable vertical shaft on which the propeller is mounted, an aerofoil beneath said propeller, a transfer box for fluid medium under pressure and including bearing means for said shaft disposed in said aerofoil, trunnions supporting said box for tilting relative to said aerofoil in a fore and aft direction, and means operable to tilt said box.

5. In an aircraft, a reaction driven direct lift propeller comprising an open framework boss and hollow blades secured thereto, said framework comprising hollow members adapted to conduct a fluid medium under pressure to said hollow blades.

6. In an aircraft, a direct lift propeller comprising a boss in the form of a plurality of crossed loop-like frames, a shaft supporting said frames at their crossed portions, and blades extending radially relative to said shaft and secured to said frame.

7. In an aircraft, a body, an outrigger extending laterally from each side of the body, an aileron hinged to each outrigger, an aerofoil of relatively short span above the body and secured thereto and to the outriggers, a rearwardly extending outrigger springing from said aerofoil and supporting an empennage assembly, a direct lift propeller above the aerofoil, and a horizontally-acting propeller intermediate the aerofoil and body.

8. In an aircraft, a body, an outrigger extending laterally from each side of the body, an aileron hinged to each outrigger, an aerofoil of relatively short span above the body and secured thereto and to the outriggers, a rearwardly extending outrigger springing from said aerofoil and supporting an empennage assembly, a direct lift propeller above the aerofoil, and a plurality of longitudinally spaced horizontally-acting propellers intermediate the aerofoil and body and symmetrically disposed relative to the direct lift propeller.

9. In an amphibian, a body, an outrigger extending laterally from each side of the body, an aileron hinged to each outrigger, a float secured to each outrigger, an aerofoil of relatively short span above the body and secured thereto and to the outriggers, a rearwardly extending outrigger springing from said aerofoil and supporting an empennage assembly, a direct lift propeller above the aerofoil, and a horizontally-acting propeller intermediate the aerofoil and body.

10. In an amphibian, a body, an outrigger extending laterally from each side of the body, an aileron hinged to each outrigger, a float secured to each outrigger, an aerofoil of relatively short span above the body and secured thereto and to the outriggers, a rearwardly extending outrigger springing from said aerofoil and supporting an empennage assembly, a direct lift propeller above the aerofoil, and a plurality of horizontally spaced horizontally-acting propellers intermediate the aerofoil and body and symmetrically disposed relative to the direct lift propeller.

11. In an aircraft, a direct lift propeller comprising a blade provided with reaction jets adjacent its following edge and jets adjacent its leading edge discharging over the top of the blade toward its following edge, said blade having separate passages therein leading to the respective jets, a substantially triangular frame element supporting said blade at an apex, the legs of said frame adjacent said apex being hollow and communicating respectively with said passages.

12. In an aircraft, a reaction-driven propeller, a blower, a plurality of internal combustion engines adapted to drive said blower either singly or in conjunction, a common conduit for the exhaust of said engines, and an airline connecting said blower and propeller and passing in heat-exchanging relation with said conduit.

13. In an aircraft, a reaction-driven propeller, a motor-driven air blower, an externally heated chamber and an internally heated chamber, and means to connect said blower and propeller through either of said chambers or through both of said chambers in either order.

14. In an aircraft, a reaction driven propeller, a blower, an internal combustion engine driving said blower, an externally heated chamber and an internally heated chamber, and means to connect said blower and propeller through either of said chambers or through both of said chambers in either order and in heat-exchanging relation with the engine exhaust.

15. In an aircraft, a reaction-driven propeller, a blower, a plurality of internal combustion engines adapted to drive said blower either singly or in conjunction, a common conduit for the exhaust of said engines, an airline connecting said blower and propeller, a second blower driven by one of said engines and having an inlet connectible with said conduit, the outlet of said second blower being connectible with said line whereby the exhaust gases may be injected into the latter.

Signed at College Point, Long Island, in the county of Queens and State of New York this 21st day of December, A. D. 1928.

IGOR SIKORSKY.